(12) United States Patent
Honma et al.

(10) Patent No.: US 8,530,565 B2
(45) Date of Patent: Sep. 10, 2013

(54) FIBER REINFORCED PROPYLENE RESIN COMPOSITION

(75) Inventors: Masato Honma, Matsuyama (JP); Atsuki Tsuchiya, Matsuyama (JP); Keiichi Asami, Chiba (JP)

(73) Assignees: Mitsui Chemicals, Inc., Tokyo (JP); Toray Industries, Inc., Tokyo (JP)

( * ) Notice: Subject to any disclaimer, the term of this patent is extended or adjusted under 35 U.S.C. 154(b) by 118 days.

(21) Appl. No.: 13/141,671

(22) PCT Filed: Dec. 24, 2009

(86) PCT No.: PCT/JP2009/071392
§ 371 (c)(1),
(2), (4) Date: Jun. 22, 2011

(87) PCT Pub. No.: WO2010/074120
PCT Pub. Date: Jul. 1, 2010

(65) Prior Publication Data
US 2011/0263778 A1    Oct. 27, 2011

(30) Foreign Application Priority Data
Dec. 25, 2008   (JP) ................................. 2008-330514

(51) Int. Cl.
*C08K 3/04* (2006.01)
*C08L 51/04* (2006.01)
*C08L 31/04* (2006.01)

(52) U.S. Cl.
USPC ............................ 524/495; 524/504; 524/524

(58) Field of Classification Search
USPC ......................................... 524/495, 522, 504
See application file for complete search history.

(56) References Cited

U.S. PATENT DOCUMENTS

| | | | |
|---|---|---|---|
| 6,660,797 B1 * | 12/2003 | Banno et al. | 524/505 |
| 2004/0220325 A1 | 11/2004 | Kitano et al. | |
| 2005/0058820 A1 * | 3/2005 | Kitano et al. | 428/297.4 |
| 2012/0015186 A1 * | 1/2012 | Honma et al. | 428/375 |

FOREIGN PATENT DOCUMENTS

| | | |
|---|---|---|
| CN | 1131956 A | 9/1996 |
| CN | 1193631 A | 9/1998 |
| CN | 1479765 A | 3/2004 |
| CN | 1523054 | 8/2004 |
| CN | 1810870 A | 8/2006 |
| CN | 1827677 A | 9/2006 |
| CN | 1908052 A | 2/2007 |
| EP | 0714940 A1 | 6/1996 |
| EP | 1862281 | 12/2007 |
| EP | 1862281 A1 * | 12/2007 |
| EP | 2 371 505 A1 | 10/2011 |
| GB | 2 143 831 A | 2/1985 |
| JP | 59-226041 | 12/1984 |
| JP | 05-239286 | 9/1993 |
| JP | 06-107442 | 4/1994 |
| JP | 07-232324 | 9/1995 |
| JP | 08-090659 | 4/1996 |
| JP | 2004-231911 | 8/2004 |
| JP | 2005-048343 | 2/2005 |
| JP | 2006-124852 | 5/2006 |
| JP | 2008-179785 A | 8/2008 |
| WO | WO-2006/101269 A1 | 9/2006 |
| WO | WO-2008/078839 A1 | 7/2008 |

OTHER PUBLICATIONS

International Search Report in PCT/JP2009/071392 dated Feb. 2, 2010.
Chinese Office Action issued in Chinese Application No. 200980150818.9 dated Sep. 5, 2012.
Communication (Supplementary EP Search Report) in EP 09834918.6 dated May 25, 2012.

* cited by examiner

*Primary Examiner* — Ling Choi
*Assistant Examiner* — Ronald Grinsted
(74) *Attorney, Agent, or Firm* — Foley & Lardner LLP

(57) ABSTRACT

[Object] The invention provides a fiber reinforced propylene resin composition having interfacial adhesion between a propylene resin and a reinforcing fiber and capable of preparing molded articles having high mechanical properties.
[Means for Achieving the Object] The fiber reinforced propylene resin composition comprises:
(A) 1 to 75% by weight of a reinforcing fiber,
(B) 0.01 to 10% by weight of a first propylene resin containing 50 to 99% by mol of a constituting unit derived from propylene of an olefin component,
(C) 0.01 to 10% by weight of a second propylene resin at least containing a carboxylic acid salt bonded to a polymer chain and
(D) 5 to 98.98% by weight of a third propylene resin,
wherein the order of the weight average molecular weights Mw of the components (B), (C) and (D) satisfy the following relation;
    component (D)>component (B)>component (C).

13 Claims, 1 Drawing Sheet

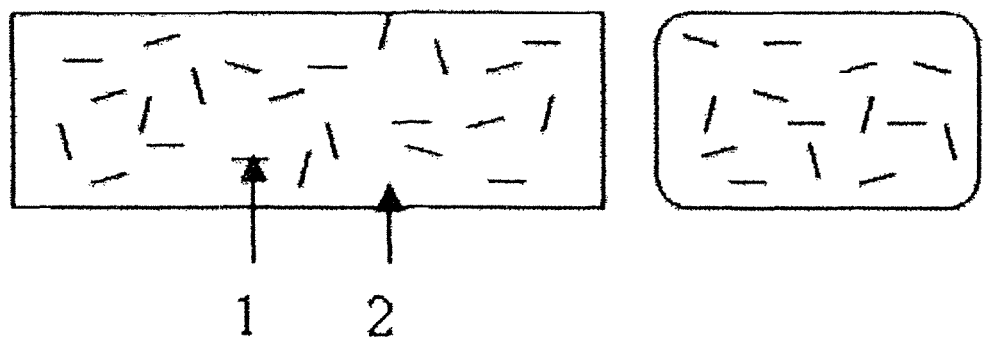

FIBER REINFORCED PROPYLENE RESIN COMPOSITION

TECHNICAL FIELD

The present invention relates to a fiber reinforced propylene resin composition and particularly it relates to a fiber reinforced propylene resin composition having excellent mechanical properties.

TECHNICAL BACKGROUND

Since compositions which comprise a reinforcing fiber and a thermoplastic resin (hereinafter optionally referred to "fiber reinforced thermoplastic resin composition") have lightweight and excellent mechanical properties, they are widely used for sporting goods, aero space uses, and general industrial uses. The reinforcing fibers used for these fiber reinforced thermoplastic resin composition reinforce molded articles according to the uses by various forms. For these reinforcing fibers, metal fibers such as aluminum fiber or stainless steel fiber; organic fibers such as aramid fiber or PBO fiber; inorganic fibers such as silicon carbide fiber or the like; and carbon fibers are used. From the viewpoint of balance between specific strength, specific rigidity and lightweight properties, carbon fibers are suitable, and among them, polyarylonitrile carbon fiber is more suitable.

In order to enhance the mechanical properties of molded articles formed from these fiber reinforced thermoplastic resin compositions, it is necessary that the amount of the reinforcing fibers such as carbon fibers is increased. However, when the amount of the reinforcing fibers is increased, it is often observed that the viscosity of the thermoplastic resin containing the reinforcing fibers is increased and thereby the molding processability are decreased, the appearance of a molded article is deteriorated and moreover, a part not filled with the thermoplastic resin is generated to cause strength deterioration.

As means for improving the mechanical properties without increasing the amount of the reinforcing fiber, there is a method of enhancing the interfacial adhesion between the reinforcing fiber and the thermoplastic resin and thereby improving the mechanical properties of a molded article.

When the reinforcing fiber is carbon fiber, the carbon fiber surface has poor reactivity, so that sufficient interfacial adhesion with the thermoplastic resin cannot be obtained in some cases. For coping with this problem, there is, for example, a method of improving the interfacial adhesion according to chemical bonding or mutual interaction with the thermoplastic resin by subjecting the carbon fiber surface to oxidation treatment, thereby adding a reactive functional group such as carboxyl group, hydroxyl group or carbonyl group.

In usual, after the surface oxidation treatment for the carbon fiber, it is general to apply a sizing agent to a carbon fiber bundle in order to improve the unity of the bundle. As the sizing agent, various compounds have been disclosed. Examples thereof are epoxy resin, urethane resin and polyamide resin.

On the carbon fiber surface on which the surface oxidation has been treated, for example, carboxyl group, hydroxyl group or carbonyl group is generated. However, there is a problem that the interfacial adhesion is insufficient and thereby a molded article having excellent mechanical properties cannot be obtained because the reactivity between these functional groups and the functional group contained in the sizing agent is insufficient.

In recent years, fiber reinforced thermoplastic composite materials have been much noticed and molded articles having excellent mechanical properties have been required with increasing the uses thereof. Furthermore, higher economic efficiency and productivity have been demanded industrially. For example, the lightweight properties and economic efficiency by fiber reinforced composite materials are desired. On this account, lightweight olefin resins, particularly propylene resin has been used for a matrix resin.

However, the propylene resin has poor interfacial adhesion with reinforcing fibers, particularly carbon fiber and thereby it is difficult to prepare molded articles having excellent mechanical properties.

Patent document 1 discloses a sizing agent for inorganic fibers obtainable by using a polypropylene resin modified with an unsaturated dicarboxylic acid or a salt thereof. Patent document 2 discloses a sizing agent containing an acid modified polypropylene resin having an acid value of 23 to 120 mgKOH/g. However, these sizing agents cannot give sufficient interfacial adhesion.

Patent document 3 discloses a carbon fiber on which an ionomer resin is adhered in an amount of 0.1 to 8% by weight. Similarly, patent document 4 discloses a carbon fiber on which two kinds of acid modified polypropylene resins are adhered in an amount of 0.1 to 8% by weight. In any of these documents, the objectives are that the interfacial adhesion between the carbon fiber and the matrix resin is improved by adhering a polymer having affinity with a polyolefin resin to the carbon fiber. However, since a modified olefin component such as the ionomer resin or the self-emulsifying polypropylene resin is adhered mainly, coating layer formation of the resin component is insufficient. Therefore, these documents have insufficient effect in order to actively improve the interfacial adhesion by forming a coating layer on the carbon fiber.

In the prior arts as described above, excellent interfacial adhesion cannot be exhibited sufficiently in molding the polyolefin resin as a matrix. Therefore, the development of a fiber reinforced propylene resin composition having excellent interfacial adhesion and capable of preparing molded articles having excellent mechanical properties has been desired.

DOCUMENT OF BACK GROUND TECHNOLOGY

Patent Document
Patent document 1: JP-A-H6 (1994)-107442
Patent document 2: JP-A-2005-48343
Patent document 3: JP-A-2006-124852
Patent document 4: WO-2006/101269

SUMMARY OF THE INVENTION

Problems to be Solved by the Invention

In view of the situation of the back ground technologies, it is an object of the present invention to provide a fiber reinforced propylene resin composition having excellent interfacial adhesion between a reinforcing fiber and a propylene resin in using the propylene resin as a matrix and capable of producing molded articles having excellent mechanical properties.

Means for the Solving the Problems

The present inventors have been earnestly studied to attain the above object and found that the object can be attained by the following fiber reinforced propylene resin composition.

(1) A fiber reinforced propylene resin composition comprising:
(A) 1 to 75% by weight of a reinforcing fiber,
(B) 0.01 to 10% by weight of a first propylene resin containing 50 to 99% by mol of a constituting unit derived from propylene of an olefin component,
(C) 0.01 to 10% by weight of a second propylene resin at least containing a carboxylic acid salt bonded to a polymer chain and
(D) 5 to 98.98% by weight of a third propylene resin,
wherein the order of the weight average molecular weights Mw of the components (B) to (D) satisfy the following relation
component (D)>component (B)>component (C).

(2) The fiber reinforced propylene resin composition according to (1) which comprises 0.3 to 45 parts by weight of the component (C) based on 100 parts by weight of the component (B).

(3) The fiber reinforced propylene resin composition according to (1) or (2) wherein the component (B) is a substantially unmodified propylene resin.

(4) The fiber reinforced propylene resin composition according to (3) wherein the component (C) contains at least a carboxylic acid salt in a total concentration of 0.05 to 5 mm mol equivalent weight in terms of the group represented by the formula (1) per 1 gram of the resin,

(5) The fiber reinforced propylene resin composition according to (3) or (4) wherein 50 to 100% of the carboxylic acid salt bonded to a polymer chain of the component (C) is converted with one or two or more metal salts selected from the group consisting of lithium salt, potassium salt, sodium salt, calcium salt, magnesium salt and zinc salt.

(6) The fiber reinforced propylene resin composition according to (3) or (4) wherein 50 to 100% of the carboxylic acid salt bonded to a polymer chain of the component (C) is converted with ammonium salt.

(7) The fiber reinforced propylene resin composition according to any one of (3) to (6) wherein the component (C) has a weight average molecular weight of 1,000 to 50,000.

(8) The fiber reinforced propylene resin composition according to any one of (3) to (7) wherein the component (B) comprises 30 to 100% by weight of a propylene resin (B-1) having a weight average molecular weight Mw of not less than 30,000 and less than 150,000 and 0 to 70% by weight of a propylene resin (B-2) having a weight average molecular weight Mw of not less than 150,000 and not more than 500,000.

(9) The fiber reinforced propylene resin composition according to any one of (3) to (8) wherein the component (D) has a carboxylic acid bonded to a polymer chain and/or its salt group.

(10) The fiber reinforced propylene resin composition according to (9) wherein the component (D) comprises 5 to 50% by weight of a propylene (D-1) having a carboxylic acid bonded to a polymer chain and/or its salt group and 50 to 95% by weight of a propylene resin (D-2) not having a carboxylic acid or its salt group.

(11) The fiber reinforced propylene resin composition according to (1) or (2) wherein the component (B) is a propylene resin at least containing a carboxylic acid salt bonded to a polymer chain.

(12) The fiber reinforced propylene resin composition according to (11) wherein the component (C) contains at least a carboxylic acid salt in a total concentration of 0.05 to 5 mm mol equivalent weight in terms of the group represented by the formula (1) per 1 gram of the resin,

(13) The fiber reinforced propylene resin composition according to (11) or (12) wherein 50 to 100% of the carboxylic acid salt bonded to a polymer chain of the component (C) is converted with one or two or more metal salts selected from the group consisting of lithium salt, potassium salt, sodium salt, calcium salt, magnesium salt and zinc salt.

(14) The fiber reinforced propylene resin composition according to (11) or (12) wherein 50 to 100% of the carboxylic acid salt bonded to a polymer chain of the component (C) is converted with ammonium salt.

(15) The fiber reinforced propylene resin composition according to any one of (11) to (14) wherein the component (C) has a weight average molecular weight Mw of 1,000 to 50,000.

(16) The fiber reinforced propylene resin composition according to any one of (11) to (15) wherein the component (B) comprises 30 to 100% by weight of a propylene resin (B-1) having a weight average molecular weight Mw of not less than 50,000 and less than 150,000 and 0 to 70% by weight of a propylene resin (B-2) having a weight average molecular weight Mw of not less than 150,000 and not more than 500,000.

(17) The fiber reinforced propylene resin composition according to any one of (11) to (16) wherein the component (D) has a carboxylic acid bonded to a polymer chain and/or its salt group.

(18) The fiber reinforced propylene resin composition according to (17) wherein the component (D) comprises 5 to 50% by weight of a propylene (D-1) having a carboxylic acid bonded to a polymer chain and/or its salt group and 50 to 95% by weight of a propylene resin (D-2) not having a carboxylic acid or its salt group.

(19) The fiber reinforced propylene resin composition according to (17) or (18), wherein the order of the mm mol equivalent weights of carboxylic aid and/or its salt group in terms of the group represented by the formula (1) —C(═O)—O— (1) per 1 gram of the resins in the components (B), (C) and (D) satisfy the following relation;
component (C)≧component (B)≧component (D)

(20) The fiber reinforced propylene resin composition according to any one of (1) to (19) wherein the reinforcing fiber of the component (A) is carbon fiber.

(21) The fiber reinforced propylene resin composition according to (20) wherein the carbon fiber has a surface oxygen concentration ratio (O/C), as measured by a X ray photoelectron spectroscopy for chemical analysis (ESCA), of 0.05 to 0.5.

(22) The fiber reinforced propylene resin composition according to any one of (1) to (21) wherein the reinforcing fiber of the component (A) is a fiber bundle made from 20,000 to 100,000 filaments.

(23) The fiber reinforced propylene resin composition according to any one of (1) to (22) wherein the reinforcing fiber of the component (A) is a chopped fiber having a fiber length of 1 to 30 mm.

Effect of the Invention

The fiber reinforced propylene resin composition of the present invention has good interfacial adhesion between a reinforcing fiber and a propylene resin and can produce molded articles having excellent mechanical properties. Furthermore, since the propylene resin is used, molded articles having excellent lightweight properties can be produced. The fiber reinforced propylene resin composition of the present invention is extremely suitable for various parts and members, for example, automobiles, electric and electronic equipments and home electrical appliances.

BRIEF DESCRIPTION OF DRAWING

FIG. 1 is a schematic view of a preferred embodiment (short fiber pellet) obtainable by using the fiber reinforced propylene resin composition of the present invention. In FIG. 1, the left view is a sectional view in an axis center direction of the short fiber pellet and the right view is a sectional view in a direction orthogonal to the axis center direction of the short fiber pellet.

EMBODIMENT FOR CARRYING OUT THE INVENTION

The fiber reinforced propylene resin composition of the present comprises (A) a reinforcing fiber, (B) a first propylene resin containing 50 to 99% by mol of a constituting unit derived from propylene of an olefin component, (C) a second propylene resin at least containing a carboxylic acid salt bonded to a polymer chain and (D) a third propylene resin.

In the fiber reinforced propylene resin composition of the present, the total amount of the reinforcing fiber (A), the first propylene resin (B) and the second propylene resin (C) and the third propylene resin (D) is 100% by weight.

The amount of the reinforcing fiber (A) is 1 to 75% by weight, preferably 5 to 65% by weight, more preferably 10 to 50% by weight. When the amount of the reinforcing fiber (A) is less than 1% by weight, the mechanical properties of a resulting molded article is sometimes insufficient, while when it is over 75% by weight, the fluidity is sometimes lowered in molding and processing such as injection molding and the like.

The amount of the first propylene resin (B) is 0.01 to 10% by weight, preferably 0.5 to 9% by weight, more preferably 1 to 8% by weight. When the amount of the first propylene resin (B) is less than 0.1% by weight, the affinity between the first propylene resin (B) and the third propylene resin (D) is sometimes insufficient, while when it is over 10% by weight, the mechanical properties of a molded article are sometimes lowered.

The amount of the second propylene resin (C) is 0.01 to 10% by weight, preferably 0.5 to 9% by weight, more preferably 1 to 8% by weight. When the amount of the second propylene resin (C) is less than 0.01% by weight, the interfacial adhesion between the reinforcing fiber and the propylene resin is sometimes insufficient, while when it is over 10% by weight, the mechanical properties of a molded article is sometimes lowered.

The amount of the third propylene resin (D) is 5 to 98.98% by weight, preferably 25 to 94% by weight, more preferably 50 to 88% by weight. Using the components in amounts of these ranges, the effect of the present invention can be attained.

With regard to the mixing amounts of the first propylene resin (B) and the second propylene resin (C), the amount of the second propylene resin (C) is preferably 0.3 to 45 parts by weight based on 100 parts by weight of the first propylene resin (B). Using the resins in the above mixing amount, the strength of a mixture itself is secured and also the affinity of the resins with the reinforcing fiber can be easily secured. Based on 100 parts by weight of the first propylene resin (B), the amount of the second propylene resin (C) is more preferably 1 to 35 parts by weight, furthermore preferably 5 to 25 parts by weight, moreover preferably 7 to 20 parts by weight. When the amount of the second propylene resin (C) is less than 0.3 part by weight, the affinity with the reinforcing fiber cannot be secured and thereby the adhesion properties are occasionally decreased. When the amount of the second propylene resin (C) is over 45 parts by weight, the strength of the mixture itself is occasionally decreased and firm adhesion properties cannot be maintained.

The fiber reinforced propylene resin composition of the present invention comprises the reinforcing fiber (A), the first propylene resin (B), the second propylene resin (C) and the third propylene resin (D), and the order of the weight average molecular weights Mw of the components (B) to (D) satisfies the following relation;

component (D)>component (B)>component (C)

In molding processing or kneading using the resin composition of the present invention, the weight average molecular weight of the component (C) is determined to be lower than the weigh average molecular weights of the components (B) and (C) in order that the component (C) most strongly fluidizes and moves easily inside the mixture of the components (A) to (D). The component (C) is modified in a form at least containing a carboxylic acid salt and the component (C) is a resin capable of most easily forming mutual interaction with the reinforcing fiber among the components (B) to (D) and most easily moves among the resin components (B) to (D). Therefore, in the steps of molding processing and kneading, the component (C) is effectively placed in the vicinity of the reinforcing fiber (A) and works for improving the interfacial adhesion between the reinforcing fiber (A) and the propylene resins. In order to attain the function, when the order of the weight average molecular weight ratio of the components (B) to (D) satisfies the relation; component (D)>component (B)>component (C), the component (C) can be easily placed in the vicinity of the reinforcing fiber (A).

Moreover, it is important that the first propylene resin (B) has a weight average molecular weight in the range between the weight average molecular weight of the second propylene resin (C) and that of the third propylene resin (D). Thereunder, the component (B) gives affinity between the component (C) and the component (D) to firm the resin component itself. The component (D) of the third propylene resin is contained in the largest amount among those of the resin components in the resin composition of the present invention and is a main component of the matrix resin. Therefore, the strength needs to be secured by enhancing the weight average molecular weight of the component (D). Since the component (C) is a modifying type and has the smallest weight average molecular weight, while the component (D) is unnecessary to be a modifying type and has the largest weight average molecular weight, the addition of the component (B) effectively gives mutual interaction of the resin components containing the components (C) and (D).

The difference between the weight average molecular weight of the component (B) (hereinafter occasionally referred to "Mw (b)") and that of the component (C) (hereinafter occasionally referred to "Mw(c)") (Mw(b)–Mw(c)) is preferably not less than 1,000, more preferably not less than 3,000, furthermore preferably not less than 5,000. The difference between the weight average molecular weight of the component (D) (hereinafter occasionally referred to "Mw(d)") and Mw(b) (Mw(d)–Mw(b)) is preferably not less than 1,000, more preferably not less than 3,000, furthermore preferably not less than 5,000.

The fiber reinforced propylene resin composition having the above composition has good interfacial adhesion between the reinforcing fiber and the propylene resins and can produce molded articles having excellent mechanical properties. Furthermore, since the propylene resins are used, molded articles having excellent lightweight properties can be prepared.

The components (A) to (D) will be described below.

[Reinforcing Resin (A)]

Not particularly limited examples of the reinforcing fiber (A) used in the present invention are fibers having high strength and high elastic modulus such as carbon fibers, glass fibers, aramid fibers, alumina fibers, silicon carbide fibers, boron fibers and metal fibers. These may be used singly or two or more may be combined for use. Among them, PAN type, pitch type and rayon type carbon fibers are preferred from the viewpoint of improvement in the mechanical properties and effect of decreasing the weight of a molded article. Furthermore, the PAN type carbon fiber is preferred from the viewpoint of balance between the strength and elastic modulus of a molded article. Moreover, in order to add conductivity, it is also possible to use reinforcing fiber covered with a metal such as nickel, copper or ytterbium.

The carbon fiber has a surface oxygen concentration ratio, which is an atomic number ratio of oxygen (O) to carbon (C) on the fiber surface [O/C], as determined by an X ray photoelectron spectroscopy for chemical analysis (ESCA), of preferably 0.05 to 0.5, more preferably 0.08 to 0.4 and furthermore preferably 0.1 to 0.3. When the surface oxygen concentration ratio is not less than 0.05, the amount of functional groups on the carbon fiber surface can be secured and more firm adhesion with the thermoplastic resin can be obtained. The upper limit of the surface oxygen concentration ratio, which is not particularly limited, is usually determined to be not more than 0.5 from the viewpoint of balance between carbon fiber handling properties and productivity.

The surface oxygen concentration ratio of the carbon fibers is determined by an X ray photoelectron spectroscopy for chemical analysis (ESCA) in the following manner. At first, a sizing agent and the like adhered on the carbon fiber surface are removed by a solvent from a carbon fiber bundle and the carbon fiber bundle is cut into chips having a 20 mm length and spread and placed on a copper made specimen support. Using AlKα1, 2 as an X ray source, the inside of a specimen chamber is kept at $1 \times 10^8$ Torr. As the correcting value of the peak accompanied with electrification in measuring, the kinetic energy value (K.E.) of the main peak of $C_{1s}$ is fitted to 1202 eV. The $C_{1s}$ peak area is determined by drawing a straight base line in the range of 1191 to 1205 eV as K.E. The $O_{1s}$ peak area is determined as K.E. by drawing a straight base line in the range of 947 to 959 eV.

The surface oxygen concentration ratio [O/C] is determined as an atom number ratio using a sensitivity correcting value inherent in a device from the ratio of the $O_{1s}$ peak area and the $C_{1s}$ peak area. As a device for the X ray photoelectron spectroscopy for chemical analysis, Model ES-200 manufactured by International Electric Co. is used and the sensitivity correcting value is determined to be 1.74.

Examples of a means for controlling the surface oxygen concentration ratio [O/C] to 0.05 to 0.5, which are not particularly limited, may include electrolytic oxidation treatment, chemical liquid oxidation treatment and gas phase oxidation treatment. Among these procedures, the electrolytic oxidation treatment is preferred.

The reinforcing fiber (A) has an average fiber diameter, which is not particularly limited, of preferably 1 to 20 μm, more preferably 3 to 15 μm from the viewpoint of mechanical properties and surface appearance of a resulting molded article. The reinforcing fiber (A) having a filament number, which is not particularly limited, of 100 to 350,000, preferably 1,000 to 250,000 can be used. From the viewpoint of the productivity of the reinforcing fiber (A), the reinforcing fiber (A) preferably having a large filament number, preferably in a rage of 20,000 to 100,000 can be used.

The form of the reinforcing fiber (A) used in the fiber reinforced propylene resin composition of the present invention is not particularly limited. When the mechanical properties of the reinforcing fiber are desired to be effectively exhibited, and the reinforcing fiber bundle that filaments are arranged in one direction is continued in a length direction. In this case, all the filaments of the reinforcing fiber bundle do not need to be continued from out to out and a part of the filaments may be divided on the way. Examples of the continuous reinforcing fiber bundle are unidirectional fiber bundle, bi-directional fiber bundle and multi-directional fiber bundle. From the viewpoint of the productivity, the one directional fiber bundle is preferably used.

When the fiber reinforced propylene resin composition of the present invention is used for compounding or injection molding, chopped fibers having a length of 1 to 30 mm is preferable, more preferably 2 to 20 mm, and furthermore preferably 3 to 10 mm, from the viewpoint of the handling properties of the reinforcing fiber (A). The feeding properties for compounding devices or injection molding machines and handling properties can be sufficiently enhanced by regulating the length of the reinforcing fiber (A) to the above range.

[First Propylene Resin (B)]

The first propylene resin (B) used in the present invention is a propylene resin having 50 to 99% by mol of a constituting unit derived from propylene of an olefin component.

Examples of the first propylene resin (B) are copolymers of propylene with at least one of an α-olefin, a conjugated diene and a non-conjugated diene. Examples of the monomer repeating unit constituting α-olefins are α-olefins having 2 to 12 carbon atoms excluding propylene such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene and 1-dodecene; and examples of the monomer repeating unit constituting conjugated diene and non-conjugated diene are butadiene, ethylidene norbornene, dicyclopentadiene and 1,5-hexadiene. For these other monomer repeating units, one kind or two or more kinds may be selected.

The first propylene resin (B) has a skeleton structure of a random or block copolymer of propylene with the above other monomers or a copolymer of the other thermoplastic monomers. Preferable examples thereof are ethylene/propylene copolymer, propylene/1-butene copolymer and ethylene/propylene/1-butene copolymer.

Particularly, in order that the affinity with the third propylene resin (D) is enhanced and the affinity with the second propylene resin (C) is enhanced while the crystallinity is decreased, it is important that the first propylene resin (B) comprises 50 to 99% by mol of a constituting unit derived from propylene, and furthermore, it comprises preferably 55 to 98% by mol, more preferably 60 to 97% by mol of a constituting unit derived from propylene.

In the present invention, the identification of the monomer repeating unit in the propylene resin can be conducted by a usual analysis procedure for polymer compounds, for example, IR, NMR, mass spectrometry and elemental analysis.

Although the first propylene resin (B) may contain a carboxylic acid salt bonded to a polymer chain, it is preferred that the resin (B) is substantially unmodified from the viewpoints of securing the strength of the resin itself and enhancing the adhesion with the reinforcing fiber. The unmodified resin is desirably unmodified completely or it is modified in a modified amount such that the above object is not missed, for example, less than 0.05 mm mol equivalent weight in terms of the group represented by —C(=O)—O—, preferably not more than 0.01 mm mol equivalent weight, more preferably not more than 0.001 mm mol equivalent weight, furthermore preferably not more than 0.0001 mm mol equivalent weight.

The weight average molecular weight Mw of the first propylene resin (B) is necessary to be larger than the weight average molecular weight Mw of the second propylene resin (C). Specifically, the first propylene resin (B) has a weight average molecular weight of preferably 30,000 to 500,000, more preferably 35,000 to 450,000. In the present invention, the weight average molecular weight is measured by using gel permeation chromatography (GPC).

The first propylene resin (B) preferably has a melt index MI at 230° C. of not less than 50, and a molecular weight distribution (Mw/Mn) of not less than 2.5. The upper limit of the molecular weight distribution (Mw/Mn) is not particularly limited, and preferably not more than 50, more preferably not more than 30.

The first propylene resin (B) preferably comprises 30 to 100% by weight of a propylene resin (B-1) having a weight average molecular weight Mw of not less than 30,000 and less than 150,000 and 0 to 70% by weight of a propylene resin (B-2) having a weight average molecular weight Mw of not less than 150,000 and not more than 500,000 from the viewpoint of having a function such that it gives the affinity between the components (C) and (D). The propylene resin (B-1) has a weight average molecular weight Mw of more preferably not less than 35,000 and not more than 140,000. The propylene resin (B-2) has a weight average molecular weight Mw of more preferably not less than 150,000 and not more than 450,000. When the weight average molecular weight Mw is too large, it is sometimes difficult to give the affinity. Therefore, the upper limit of the weight average molecular weight Mw is preferably determined to be in the above range. In the present invention, when the resin (B) is a mixture of the propylene resin (B-1) and the propylene resin (B-2), the weight average molecular weight Mw of the resin (B) is an arithmetic mean of the weight average molecular weights Mw of the propylene resins.

When the third propylene resin (D) is an acid modified propylene resin, the first propylene resin (B) is preferably modified in order to enhance the affinity. Specifically, the first propylene resin (B) at least has a carboxylic acid salt bonded to a polymer chain, the modified amount thereof is preferably not less than 0.05 mm mol equivalent weight in terms of the group represented by —C—(=O)—O—. Furthermore, the weight average molecular weight Mw of the first propylene resin (B) needs to be larger than the weight average molecular weight Mw of the second propylene resin (C). Specifically, the first propylene resin (B) has a weight average molecular weight Mw of preferably over 50,000 and not more than 150,000, more preferably 60,000 to 130,000. The first propylene resin (B) at least containing a carboxylic acid salt bonded to a polymer chain can be produced in the same way as that of the second propylene resin (C).

The first propylene resin (B) comprises 35 to 100% by weight of the propylene resin (B-1) and 0 to 65% by weight of the propylene resin (B-2).

[Second Propylene Resin (C)]

The second propylene resin (C) is a propylene resin at least containing a carboxylic acid salt bonded to a polymer chain.

It is effective that the propylene resin contains a carboxylic acid salt in order to enhance the mutual interaction with the reinforcing fiber.

The second propylene resin (C) can be prepared by graft polymerizing a copolymer of propylene and an α-olefin or two or more α-olefins, typified by polypropylene, ethylene/propylene copolymer, propylene/1-butene copolymer or ethylene/propylene/1-butene copolymer, with a monomer having a neutralized or un-neutralized carboxylic acid group and/or a monomer having a saponified or un-saponified carboxylic acid ester. The monomer repeating unit of the copolymer of propylene and one or two or more α-olefins and the skeleton structure thereof can be determined in the same way as that in the first propylene resin (B).

Examples of the monomer having a neutralized or un-neutralized carboxylic acid group and the monomer having a saponified or un-saponified carboxylic acid ester group are ethylene unsaturated carboxylic acids, their anhydrides and their esters, and furthermore, compounds having an unsaturated vinyl group other than olefins.

Examples of the ethylene unsaturated carboxylic acid are (meth)acrylic acid, maleic acid, fumaric acid, tetrahydrophthalic acid, itaconic acid, citraconic acid, crotonic acid and isocrotonic acid. Examples of anhydrides thereof are Nadic Acid™ (endocis-bicyclo[2.2.1] hepto-5-ene-2,3-dicarboxylic acid), maleic anhydride and citraconic anhydride.

Examples of the monomer having an unsaturated vinyl group other than olefins are:

(meth)acrylic acid esters such as methyl(meth)acrylate, ethyl(meth)acrylate, propyl(meth)acrylate, n-butyl(meth)acrylate, i-butyl(meth)acrylate, tert-butyl(meth)acrylate, n-amyl(meth)acrylate, isoamyl(meth)acrylate, n-hexyl(meth)acrylate, 2-ethylhexyl(meth)acrylate, octyl(meth)acrylate, decyl(meth)acrylate, dodecyl(meth)acrylate, octadecyl(meth)acrylate, stearyl(meth)acrylate, tridecyl(meth)acrylate, lauroyl(meth)acrylate, cyclohexyl(meth)acrylate, benzyl(meth)acrylate, phenyl(meth)acrylate, isoboronyl(meth)acrylate, dicyclopentanyl(meth)acrylate, dicyclopentenyl(meth)acrylate, dimethylaminoethyl(meth)acrylate, and diethylaminoethyl(meth)acrylate;

hydroxyl group-containing vinyls such as hydroxyethyl acrylate, 2-hydroxyethyl (meth)acrylate, 2-hydroxypropyl (meth)acrylate, 4-hydroxybutyl acrylate, lactone-modified hydroxyethyl (meth)acrylate and 2-hydroxy-3-phenoxypropyl acrylate;

epoxy group-containing vinyls such as glycidyl (meth)acrylate and methylglycidyl (meth)acrylate; isocyanate group-containing vinyls such as vinyl isocyanate and isopropenyl isocyanate;

aromatic vinyls such as styrene, α-methylstyrene, vinyl toluene and t-butyl styrene;

amides such as acrylamide, methacrylamide, N-methylol methacrylamide, N-methylol acrylamide, diacetone acrylamide and maleic acid amide;

vinyl esters such as vinyl acetate and vinyl propionate;

aminoalkyl(meth)acrylates such as N,N-dimethylaminoethyl (meth)acrylate, N,N-diethylaminoethyl (meth)acrylate, N,N-dimethylaminopropyl (meth)acrylate, N,N-dipropylaminoethyl (meth)acrylate, N,N-dibutylaminoethyl (meth)acrylate and N,N-dihydroxyethyl aminoethyl (meth)acrylate;

unsaturated sulfonic acids such as styrene sulfonic acid, styrene sulfonic acid soda and 2-acrylamide-2-methylpropane sulfonic acid; and unsaturated phosphoric acids such as mono(2-methacryloyloxy ethyl)acid phosphate and mono(2-acryloyloxy ethyl) acid phosphate.

These monomers may be used singly, or two or more may be mixed for use. Among them, acid anhydrides are preferable and furthermore, maleic anhydride is preferable.

The materials of the second propylene resin (C) can be obtained by various methods. For examples, there are a method of allowing a propylene resin to react with an ethylene unsaturated carboxylic acid having an unsaturated vinyl group or a monomer having an unsaturated vinyl group other than olefins in an organic solvent in the presence of a polymerization initiator, and then removing the solvent, a method of preparing a melt by heat melting a propylene resin, allowing the melt to react with a carboxylic acid having an unsaturated vinyl group and a polymerization initiator under stirring, and a method of mixing a propylene resin, a carboxylic acid having an unsaturated vinyl group and a polymerization initiator, feeding the mixture into an extruder and reacting it with heat kneading.

Examples of the polymerization initiator used in the present invention are benzoyl peroxide, dichlorobenzoyl peroxide, dicumylperoxide, di-tert-butyl peroxide, 2,5-dimethyl-2,5-di(peroxybenzoate)hexyne-3 and 1,4-bis(tert-butylperoxyisopropyl)benzene. These may be used singly or two or more may be mixed for use.

Examples of the organic solvent are aromatic hydrocarbons such as xylene, toluene and ethylbenzene; aliphatic hydrocarbons such as hexane, heptane, octane, decane, isooctane and isodecane; alicyclic hydrocarbons such as cyclohexane, cyclohexene, methylcyclohexane and ethylcyclohexane; ester solvents such as ethyl acetate, n-butyl acetate, cellosolve acetate, propylene glycol monomethylether acetate, propylene glycol monoethylether acetate and 3-methoxybutyl acetate; and ketone solvents such as methylethyl ketone, methylisobutyl ketone. Two or more of these solvents may be mixed for use. Among these solvents, aromatic hydrocarbons, aliphatic hydrocarbons and alicyclic hydrocarbons are preferred and further aliphatic hydrocarbons and alicyclic hydrocarbons are more preferably used.

The second propylene resin (C) can be obtained by neutralizing or saponifying the raw material of the second propylene resin (C) prepared as described above. In the case of carrying out neutralization or saponification, it is easy and preferred that the raw material of the second propylene resin (C) is dispersed in the aqueous dispersion.

As the basic substance used in the neutralization or saponification in preparing the aqueous dispersion of the raw material of the second propylene resin (C), there are alkali metals and/or alkali earth metals and/or other metals such as sodium, potassium, lithium, calcium, magnesium and zinc; inorganic amines such as hydroxylamine and ammonium hydroxide; organic amines such as ammonia, (tri) methylamine, (tri) ethanol amine, (tri)ethylamine, dimethylethanol amine and morpholine; and sodium oxides, sodium peroxides, oxides of alkali metals and/or alkali earth metals and/or other metals, hydroxides, hydrides, weak acid salts of alkali metals and/or alkali earth metals and/or other metals such as sodium carbonate. Preferable examples of the carboxylic acid salt group or the carboxylic acid ester group neutralized or saponified with the basic substance are carboxylic acid alkali metal salts such as sodium carboxylate and potassium carboxylate or ammonium carboxylate.

In the second propylene resin (C), 50 to 100% of the carboxylic acid salts bonded to the polymer chain is preferably converted by one or two or more metal salts selected from lithium salt, potassium salt, sodium salt, calcium salt, magnesium salt and zinc salt, particularly preferably by ammonium salt.

The degree of neutralization or the degree of saponification, namely, the degree of conversion of carboxylic acid group of the raw material for the second propylene resin (C) into the metal salt or ammonium salt is usually 50 to 100%, preferably 70 to 100%, more preferably 85 to 100% from the viewpoint of the stability of the aqueous dispersion and the adhesion with fibers.

Therefore, all the carboxylic acid groups in the second propylene resin (C) is desirably neutralized or saponified by the above basic substance, but a part thereof may be remained without neutralization or saponification. Examples of the procedure for analyzing a salt component of the acid group are a procedure of detecting the kind of a metal of forming the salt by ICP emission spectrographic analysis and a procedure of identifying the salt structure of the acid group using IR, NMR, mass analysis and elemental analysis.

The degree of conversion of the carboxylic acid group into a neutralized salt is determined by, for example a method of dissolving the propylene resin in heated toluene, titrating with a 0.1 normal potassium hydroxide-ethanol standard solution, measuring the acid value of the propylene resin using the following formula and calculating the degree comparing with the total mole number of the original carboxylic acid group.

$$\text{Acid value} = (5.611 \times A \times F)/B \text{ (mg KOH/g)}$$

A: Amount of 0.1 normal potassium hydroxide-ethanol standard solution used (ml)

F: Factor of 0.1 normal potassium hydroxide-ethanol standard solution

B: Amount of a specimen collected (g)

The acid value determined above is converted into the mole number of an un-neutralized carboxylic acid group by the following formula.

$$\text{Mole number of un-neutralized carboxylic acid group} = \text{Acid value} \times 1000/56 \text{ (mol/g)}$$

The degree of conversion of the carboxylic acid into a neutralized salt is determined by the following formula using the total mole number (mole/g) of carboxylic acid group calculated by determination of carbonyl carbon of the carboxylic acid group using IR, NMR and elemental analysis.

$$\text{Degree of conversion} = (1-r) \times 100 (\%)$$

r: Mole number of un-neutralized carboxylic acid group/Total mole number of carboxylic acid group From the viewpoint of enhancing the mutual interaction with the reinforcing fiber, the amount of the carboxylic acid salt bonded to the polymer chain of the second propylene resin (C) is preferably 0.05 to 5 mm mol equivalent weight in terms of the group represented by —C(=O)—O— per 1 gram of the second propylene resin, more preferably 0.1 to 4 mm mol equivalent weight, furthermore preferably 0.3 to 3 mm mol equivalent weight. Examples of the procedure for analyzing the amount of the carboxylic acid salt are a procedure of detecting the kind of a metal of forming the salt quantitatively by ICP emission spectrographic analysis and a procedure of determining quantity of the carbonyl carbon of the carboxylic acid salt using IR, NMR and elemental analysis.

From the viewpoints of moving of the second propylene resin (C) into the periphery of the reinforcing fiber (A) and enhancing the mutual interaction by forming the interlocking of molecular chains between the reinforcing fiber (A) and the first propylene resin (B), the second propylene resin (C) has a weight average molecular weight Mw of preferably 1,000 to 50,000, more preferably 2,000 to 40,000 furthermore preferably 5,000 to 30,000. In the present invention, the weight average molecular weight is determined using gel permeation chromatography (GPC).

[Third Propylene Resin (D)]

The third propylene resin (D) of the present invention is a propylene homopolymer or a copolymer of propylene and at least one of an α-olefin, a conjugated diene or a non-conjugated diene.

Examples of the monomer repeating unit constituting α-olefins are α-olefins having 2 to 12 carbon atoms excluding propylene such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene and 1-dodecene; and examples of the monomer repeating unit constituting conjugated diene and non-conjugated diene are butadiene, ethylidene norbornene, dicyclopentadiene and 1,5-hexadiene. For these other monomer repeating units, one kind or two or more kinds may be selected.

Examples of the skeleton structure of the third propylene resin (D) are a propylene homopolymer, a random or block copolymer of propylene and one or two or more of the other monomers, and a copolymer of the other thermoplastic monomers. Preferable examples are polypropylene, ethylene/propylene copolymer, propylene/1-butene copolymer and ethylene/propylene/1-butene copolymer.

It is important that the third propylene resin (D) has a weight average molecular weight satisfying the following relation regarding the order of the weight average molecular weight of each component:

component (D)>component (B)>component (C)

Since the third propylene resin (D) functions as a matrix resin in a molded article formed by the molding materials of the present invention and it needs to have the strength itself, it is important that the weight average molecular weight of the third propylene resin (D) is determined to be higher than those of the resins (B) and (C). In the present invention, the weight average molecular weight is measured by using gel permeation chromatography (GPC).

The third propylene resin (D) is preferably a modified propylene resin from the viewpoint of improving the mechanical properties of a resulting molded article, and further it is preferably an acid modified propylene resin which is a propylene resin having a carboxylic acid bonded to a polymer chain and/or its salt group. The acid modified propylene resin can be prepared by various methods, for example, the same method as the methods of preparing the raw material of the second propylene resin (C) and the second propylene resin (C).

When the third propylene resin (D) is a propylene resin having a carboxylic acid bonded to a polymer chain and/or its salt group, it is preferably mixed with an unmodified propylene resin in consideration of maintaining high mechanical properties of the resin and the cost for the raw material. Specifically, the third propylene resin (D) preferably comprises 5 to 50% by weight of a propylene resin (D-1) having a carboxylic acid bonded to a polymer chain and/or its salt group and 50 to 95% by weight of a propylene resin (D-2) not having a carboxylic acid and/or its salt group. It comprises more preferably 5 to 45% by weight of the component (D-1) and 55 to 95% by weight of the component (D-2), furthermore preferably 5 to 35% by weight of the component (D-1) and 65 to 95% by weight of the component (D-2).

When the third propylene resin (D) is an acid modified propylene resin, the first propylene resin (B) is preferably also modified in order to enhance the affinity. Specifically, the first propylene resin (B) at least has a carboxylic acid salt bonded to a polymer chain and the modified amount thereof is preferably not less than 0.05 mm mol equivalent weight in terms of a group represented by —C(=O)—O—. The first propylene resin (B) at least containing a carboxylic acid salt bonded to a polymer chain can be prepared by the same production process as that of the second propylene resin (C).

When the first to third propylene resins are propylene resins at least containing a carboxylic acid bonded to a polymer chain and/or its salt, the amounts of the carboxylic acid and/or its salt in terms of the group represented by —C(=O)—O— per 1 gram of the resin, namely, the order of the mm mol equivalent weights of —C(=O)—O— per 1 gram of the resin components (C) to (D) preferably satisfy the following relation:

component (C)≧component (B)≧component (D)

This indicates that the second propylene resin (C) present on the periphery of the reinforcing fiber has a large acid modified amount from the viewpoint of adhesion to the reinforcing fiber.

The acid modified amount of the third propylene resin (D) is preferably lower than that of the second propylene resin (C) from the viewpoints of the cost of the resin and the general tendency that when the acid modified amount is increased, the resin itself becomes brittle and the strength thereof decreases. The acid modified amount of the first propylene resin (B) is preferably lower than that of the second propylene resin (C) and larger than that of the third propylene resin (D) from the viewpoint that the first propylene resin (B) functions as linkage between the second and third propylene resins.

The fiber reinforced propylene resin composition of the present invention does not contain a molding material obtainable by adhering the component (D) with a composite body comprising the components (A) to (C).

The fiber reinforced propylene resin composition of the present invention may contain impact improvers, other fillers and additives such as elastomers or rubber components within not marring the object of the present invention. Examples thereof are an inorganic filler, a flame retardant, an electric conductivity imparting agent, a crystalline nucleating agent, an ultraviolet absorbing agent, an antioxidant, a damping material, an antibacterial agent, insect deterrent, a deodorant, an anti-coloring agent, a heat stabilizer, release agent, an antistatic agent, a plasticizer, a lubricant, a coloring agent, a pigment, a dye, a foaming agent, a defoaming agent and a coupling agent.

[Uses]

The fiber reinforced propylene resin composition of the present invention can be processed into products having a final shape by various known molding methods. Examples of the molding methods are press molding, transfer molding, injection molding and a combination thereof. The molded articles are suitable for automobile parts of various modules such as instrument panels, door beams, under covers, lamp housings, pedal housings, radiator supports, spare tire covers and front ends. The molded articles are also suitable for home and office appliances parts such as telephones, facsimiles, VTR, copying machines, televisions, microwave ovens, sound equipments, toiletry goods, laser disks, refrigerators and air conditioners. Furthermore, they are used to housings for personal computers and mobile phones, and electric and parts for electronic appliances typified by keyboard supports which are members for supporting keyboards inside personal computers. In these parts for electric and electronic appliances, it is preferred to use a carbon fiber having electric conductivity for the reinforcing fiber because it gives electromagnetic wave shielding properties.

EXAMPLE

The present invention will be described in more detail with reference to the following examples.

(1) Measurement for Weight Average Molecular Weight of Propylene Resin

The first propylene resin (B), the second propylene resin (C) and the third propylene resin (D) were measured by gel permeation chromatography (GPC). A GPC column filled with a polystyrene crosslinked gel was used. The measurement was carried out using 1,2,4-trichlorobenzene as a solvent at 150° C. The molecular weight was determined by converting relative to standard polystyrene.

(2) Structural Analysis of Propylene Resin

With regard to the first, second and third propylene resins, organic compound elemental analysis, inductively coupled plasma arc (ICP) emission spectrometry, IR (infrared absorption) spectrum analysis, $^1$H-NMR measurement and $^{13}$C-NMR measurement were carried out to evaluate the proportion of the monomer structure from the element amount of the propylene resins, the identification of the functional group structure, assignment of each proton and the peak strength of carbon.

The organic compound elemental analysis was carried out using an inorganic elemental analysis apparatus 2400II (manufactured by Perkin Elmer). The ICP emission analysis was carried out using ICPS-7510 (manufactured by Shimazu Corporation). The IR spectrum analysis was carried out using IR-Prestige-21 (manufactured by Shimazu Corporation). The $^1$H-NMR measurement and $^{13}$C-NMR measurement were carried out using JEOL JNM-GX400 spectrometer (manufactured by JEOL Ltd).

(3) Flexural Test for Molded Article Prepared Using Fiber Reinforced Propylene Resin Composition The flexural strength and flexural modulus of elasticity were measured using a 3 point flexural testing jig (indenter 10 mm, support 10 mm) with a spun length of 100 mm at a cross head speed of 5.3 mm/min in accordance with ASTM D790 (1997). "Instron" (Trade Mark) universal tester 4201 model (manufactured by Instron Co., Ltd) was used as a testing machine.

The decision of the flexural strength was carried out in the following criterions, and the ranks A to C were acceptable.
A: not less than 120 Mpa
B: not less than 100 MPa and less than 120 MPa
C: not less than 80 MPa and less than 100 MPa
D: less than 80 MPa (4) The mold notched Izod impact test was carried out on the molded article prepared using the fiber reinforced propylene resin composition in accordance with Izod impact test ASTM D256 (1993). Using the specimen used having a thickness of 3.2 mm and a water content of not more than 0.1% by weight, the Izod impact strength (J/m) was measured.

The determination of the Izod impact test was carried out in the following criterions and the ranks A to C were acceptable.
A: not less than 210 J/m
B: not less than 180 J/m and less than 210 J/m
C: not less than 150 J/m and less than 180J/m
D: less than 150 J/m (5) Evaluation for Interfacial Adhesion on Molded Article Prepared Using Fiber Reinforced Propylene Resin Composition After the Izod impact test (3), the fracture surface of a ruptured sample was observed by SEM (scanning electron microscope). Any five reinforcing fibers were selected for the visual observation whether the adhesion of the resin components on the surface of the reinforcing fibers was present or not. The determination was carried out in the following criterions and the ranks A and B were acceptable.

A: Adhesion of the resins was observed on almost all the area of the reinforcing fiber surface (not less than 90%)

B: Adhesion of the resins was observed on the area not less than 50% and less than 90% of the reinforcing fiber surface.

C: Adhesion of the resins was observed on the area less than 50% of the reinforcing fiber surface.

Reference Example 1

Carbon Fiber 1

From a copolymer containing polyacrylonitrile as a main component, a continuous carbon fiber having a total filament number of 24,000 was prepared through spinning, burning treatment and surface oxidation treatment. This continuous carbon fiber had the properties as described below.

Filament diameter: 7 μm
Mass per unit length: 1.6 g/m
Specific gravity: 1.8
Surface oxygen concentration ratio [O/C]: 0.06
Tensile strength: 4600 MPa
Tensile modulus of elasticity: 220 GPa The surface oxygen concentration ratio was determined using a carbon fiber prepared after the surface oxidation treatment, by an X ray photoelectron spectroscopy for chemical analysis in the following procedure. At first, a carbon fiber bundle was cut into a length of 20 mm and put and spread on a copper specimen supporting plate. The inside of a specimen chamber was kept at $1 \times 10^8$ Torr using AlKα1, 2 as an X ray source. As a correction value of a peak accompanied with electrification at the time of measuring, the kinetic energy value (K.E.) of the main peak of $C_{1s}$ was set to 1,202 eV. The $C_1$, peak area was determined by drawing a straight base line in range of 1,191 to 1,205 eV as K.E. The $O_{1s}$ peak area was determined by drawing a straight base line in the range of 947 to 959 eV as K.E. It was calculated as an atomic ratio from the ratio of the $O_{1s}$ peak area and the $C_{1s}$ peak area using the sensitivity correction value inherent in the device. As a device for the X ray photoelectron spectroscopy, Model ES-200 manufactured by Kokusai Electric Inc was used and the sensitivity correction value was 1.74.

Reference Example 2

Carbon Fiber 2

From a copolymer containing polyacrylonitrile as a main component, a continuous carbon fiber having a total filament number of 24,000 was prepared through spinning, burning treatment and surface oxidation treatment. This continuous carbon fiber had the properties as described below.

Filament diameter: 7 μm
Mass per unit length: 1.6 g/m
Specific gravity: 1.8
Surface oxygen concentration ratio [O/C]: 0.12
Tensile strength: 4600 MPa
Tensile modulus of elasticity: 220 GPa

Reference Example 3

Preparation of Propylene Resin Mixture PP(1)

91 Parts by weight of a propylene/butene/ethylene copolymer (B-1) (having a constituting unit derived from propylene (hereinafter sometimes referred to "C3") of 66% by mole and Mw of 90,000) as the first propylene resin (B), 9 parts by weight of a maleic anhydride modified propylene/ethylene copolymer (having C3 of 98% by mole, Mw of 25,000 and an acid content of 0.81 mm mol equivalent weight) as a raw material of the second propylene resin (C-1) and 3 parts by weight of potassium oleate as the surfactant were mixed. This mixture was fed at a rate of 3,000 g/hr from a hopper of a twin screw extruder (PCM-30, L/D of 40, manufactured by Ikegai Tekko Inc., and further a 20% potassium hydroxide aqueous solution was continuously fed at a rate of 90 g/hr from a port provided on a vent part of the extruder, and they were extruded continuously at a heating temperature of 210° C. The resin mixture extruded was cooled to 110° C. by a static mixer equipped with a jacket provided on the port of the extruder and injected into warm water at 80° C. to prepare an emulsion. The resulting emulsion had a solid component concentration of 45%.

The maleic anhydride modified propylene/ethylene copolymer (having C3 of 98% by mole, Mw of 25,000 and an acid content of 0.81 mm mol equivalent weight) was prepared by mixing 96 parts by weight of a propylene/ethylene copolymer, 4 parts by weight of maleic anhydride and 0.4 part by weight of PERHEXYNE 25B (manufactured by NOF CO.) as the polymerization initiator and modifying at a heating temperature of 160° C. for 2 hr.

Reference Example 4

Preparation of Propylene Resin Mixture PP(2)

The procedure of Reference Example 3 was repeated except for using a maleic anhydride modified propylene/ethylene copolymer (having C3 of 98% by mole, Mw of 5,000 and an acid content of 0.81 mm mol equivalent weight) as the raw material of the second propylene resin (C-2) to prepare an emulsion. The resulting emulsion had a solid component concentration of 45% by weight.

Reference Example 5

Preparation of Propylene Resin Mixture PP(3)

The procedure of Reference Example 3 was repeated except for using a maleic anhydride modified propylene/ethylene copolymer (having C3 of 95% by mole, Mw of 25,000 and an acid content of 0.1 mm mol equivalent weight) as the second propylene resin (C-3) to prepare an emulsion. The resulting emulsion had a solid component concentration of 45% by weight.

Reference Example 6

Preparation of Propylene Resin Mixture PP(4)

The procedure of Reference Example 3 was repeated except for changing the feeding rate of the 20% potassium hydroxide aqueous solution from 90 g/hr to 43 g/hr and preparing a second propylene resin (C-4), to prepare an emulsion. The resulting emulsion had a solid component concentration of 45% by weight.

Reference Example 7

Preparation of Propylene Resin Mixture PP(5)

The procedure of Reference Example 3 was repeated except changing the 20% potassium hydroxide aqueous solution was changed to 20% aqueous ammonia and the feeding rate was changed from 90 g/hr to 150 g/hr, and preparing a second propylene resin (C-5), to prepare an emulsion. The resulting emulsion had a solid component concentration of 45% by weight.

Reference Example 8

Preparation of Propylene Resin Mixture PP(6)

The procedure of Reference Example 3 was repeated except for using a maleic anhydride modified propylene/ethylene copolymer (C-6) (having C3 of 95% by mole, Mw of 40,000 and an acid content of 0.81 mmol equivalent weight) as the raw material of the second propylene resin (C) to prepare an emulsion. The resulting emulsion had a solid component concentration of 45% by weight.

Reference Example 9

Preparation of Propylene Resin Mixture PP(7)

The procedure of Reference Example 3 was repeated except for using a mixture of 45.5 parts by weight of a propylene/butane/ethylene copolymer (B-1) (having C3 of 66% by mole and Mw of 90,000) and 45.5 parts by weight of a propylene/butane copolymer (B-2) (having C3 of 81% by mole and Mw of 300,000) as the first propylene resin (B) to prepare an emulsion. The resulting emulsion had a solid component concentration of 45% by weight.

Reference Example 10

Preparation of Propylene Resin Mixture PP(8)

The procedure of Reference Example 3 was repeated except for using a maleic anhydride modified propylene/butane/ethylene copolymer (B-3) (having C3 of 66% by mole, Mw of 70,000 and an acid content of 0.81 mm mol equivalent weight) as the first propylene resin (B) to prepare an emulsion. The resulting emulsion had a solid component concentration of 45%.

Reference Example 11

Preparation of Propylene Resin Mixture PP(9)

An unmodified propylene resin (having a weight average molecular weight of 100,000) was pulverized to prepare propylene resin powder having an average particle diameter of 10 μm. The resulting powder was introduced into n-hexane and stirred to prepare a suspension of the unmodified propylene resin. The solid component concentration thereof was 45% by weight.

Reference Example 12

Preparation of Propylene Resin Mixture PP(10)

The procedure of Reference Example 3 was repeated except for using the maleic anhydride modified propylene/ethylene copolymer (B-4) (same as (C-1)) (having C3 of 98% by mole, Mw of 25,000 and an acid content of 0.81 mm mol equivalent weight), which was used as the raw material of the second propylene resin (C), as the first propylene resin (B) to prepare an emulsion. The resulting emulsion had a solid component concentration of 45% by weight.

Reference Example 13

Preparation of Propylene Resin Mixture PP(11)

The procedure of Reference Example 3 was repeated except for using a maleic anhydride modified propylene/ethylene copolymer (C-7) (having C3 of 95% by mole, Mw of 200,000 and an acid content of 0.81 mm mol equivalent weight) as the raw material of the second propylene resin (C) to prepare an emulsion. The resulting emulsion had a solid component concentration of 45% by weight.

Reference Example 14

Preparation of Propylene Resin Mixture PP(12)

The procedure of Reference Example 3 was repeated except for using 50 parts by weight of the propylene/butane/ethylene copolymer (B-1) (having a constituting unit derived from propylene (hereinafter sometimes referred to "C3") of 66% by mole and Mw of 90,000) as the first propylene resin (B) and 50 parts by weight of a maleic anhydride modified propylene/ethylene copolymer (having C3 of 98% by mole, Mw of 25,000 and an acid content of 0.81 mm mol equivalent weight) as the raw material of the second propylene resin (C) to prepare an emulsion. The resulting emulsion had a solid component concentration of 45%.

Reference Example 15

Synthesis of Acid Modified Propylene Resin Used for Third Propylene Resin (D)

99.6 parts by weight of a propylene polymer, 0.4 part by weight of maleic anhydride and 0.4 part by weight of PERHEXYNE 25B (manufactured by NOF CO.) as a polymerization initiator were mixed and modified at a heating temperature of 160° C. for 2 hr to prepare an acid modified polypropylene resin (D-2) (having Mw of 400,000 and an acid content of 0.08 mm mol equivalent weight).

Example 1

An emulsion of the propylene resin mixture PP(1) prepared in Reference Example 3 containing the first propylene resin (B-1) and the second propylene resin (C-1) was regulated to have a solid component concentration of 27% by weight. The emulsion was adhered on the continuous carbon fiber bundle prepared in Reference Example 1 by a roller impregnation method, and dried online at 210° C. for 2 min to remove moisture, and thereby a carbon fiber bundle on which the propylene resin mixture PP(1) was adhered was prepared. The adhered amount was 20% by weight.

Next, the resulting carbon fiber bundle was cut into a size of ¼ inch by a cartridge cutter.

Using TEX-30α type twin screw extruder (having a screw diameter of 30 mm and L/D of 32) (manufactured by Japan Steel Works Ltd.), the polypropylene resin (D-1) (Prime polypro J105G resin manufactured by Prime Polymer Co., Ltd) as the third propylene resin (D) was fed from a main hopper and then the carbon fiber bundle cut was fed from a side hopper provided in the downstream of the main hopper and sufficiently kneaded at a barrel temperature of 220° C. at a rotating rate of 150 rpm, and further degassing was carried out by a vacuum vent provided in the downstream. The feeding was regulated by a weight feeder so that the content of the carbon fiber only was 20% by weight. The molten resin was discharged from a dies port (having a diameter of 5 mm) and the resulting strand was cooled and cut by a cutter to prepare a pelletized molding material (hereinafter sometimes referred to "short fiber pellets"). In the short fiber pellets, the component (A) uniformly dispersed in an average fiber length of 0.3 mm and the components (B) to (D) uniformly mixed. The cross section in the axial center direction of the short fiber pellets and the cross section in a direction orthogonal to the axial center direction were shown in FIG. 1.

Next, the short fiber pellets prepared through the extrusion step was molded into a specimen for evaluating the properties (molded article) using J350EIII type injection molding machine manufactured by Japan Steel Works Ltd., at a cylinder temperature of 220° C. and a mold temperature of 60° C. The resulting specimen was allowed to stand in a constant temperature and humidity room regulated at 23° C. and 50% RH for 24 hr and submitted to tests for evaluating the properties. Next, the specimen (molded article) was evaluated in accordance with the method of evaluating injection-molded articles. The evaluation results were inclusively shown in Table 1. The resulting molded article had a carbon fiber proportion of 20% by weight and had an average carbon fiber length of 0.2 mm.

The average fiber length of the carbon fibers of the specimen was determined in the following manner. The molded article piece was treated with heating in an electric furnace at 500° C. for 60 min to decompose and volatile the resin. About 100 carbon fibers remained were extracted at random and the lengths thereof were measured by a microscope. The average of the lengths measured was taken as an average fiber length of the carbon fibers.

Example 2

The procedure of Example 1 was repeated except for using a resin consisting of 50% by weight of the polypropylene resin (D-1) (Prime polypro J105G resin manufactured by Prime polymer Co., Ltd) and 50% by weight of the acid modified propylene resin (D-2) prepared in Reference Example 15 as the third propylene resin (D) to prepare short fiber pellets. The molding evaluation was carried out. The property evaluation results were inclusively shown in Table 1.

Example 3

The procedure of Example 2 was repeated except that the solid component concentration of the emulsion of the propylene resin mixture PP(1) was 10% by weight to prepare short fiber pellets, then the molding evaluation was carried out. The property evaluation results were inclusively shown in Table 1.

Example 4

The procedure of Example 2 was repeated except that the solid component concentration of the emulsion of the propylene resin mixture PP(1) was 45% by weight to prepare short fiber pellets, then the molding evaluation was carried out. The property evaluation results were inclusively shown in Table 1.

Example 5

The procedure of Example 2 was repeated except that the solid component concentration of the emulsion of the propylene resin mixture PP(12) prepared in Reference Example 14 was 35% by weight to prepare short fiber pellets, then the molding evaluation was carried out. The property evaluation results were inclusively shown in Table 1.

Example 6

The procedure of Example 2 was repeated except that the solid component concentration of the emulsion of the propylene resin mixture PP(2) prepared in Reference Example 4 was 27% by weight to prepare short fiber pellets, then the molding evaluation was carried out. The property evaluation results were inclusively shown in Table 1.

Example 7

The procedure of Example 2 was repeated except that the emulsion of the propylene resin mixture PP(3) prepared in Reference Example 5 was used to prepare short fiber pellets, then the molding evaluation was carried out. The property evaluation results were inclusively shown in Table 2.

Example 8

The procedure of Example 2 was repeated except that the emulsion of the propylene resin mixture PP(4) prepared in Reference Example 6 was used to prepare short fiber pellets, then the molding evaluation was carried out. The property evaluation results were inclusively shown in Table 2.

Example 9

The procedure of Example 2 was repeated except that the emulsion of the propylene resin mixture PP(5) prepared in Reference Example 7 was used to prepare short fiber pellets, then the molding evaluation was carried out. The property evaluation results were inclusively shown in Table 2.

Example 10

The procedure of Example 2 was repeated except that the emulsion of the propylene resin mixture PP(6) prepared in Reference Example 8 was used to prepare short fiber pellets, then the molding evaluation was carried out. The property evaluation results were inclusively shown in Table 2.

Example 11

The procedure of Example 2 was repeated except that the emulsion of the propylene resin mixture PP(7) prepared in Reference Example 9 was used to prepare short fiber pellets, then the molding evaluation was carried out. The property evaluation results were inclusively shown in Table 2.

Example 12

The procedure of Example 2 was repeated except that the emulsion of the propylene resin mixture PP(8) prepared in Reference Example 10 was used to prepare short fiber pellets, then the molding evaluation was carried out. The property evaluation results were inclusively shown in Table 2.

Example 13

The procedure of Example 2 was repeated except that the continuous carbon fiber prepared in Reference Example 2 was used to prepare short fiber pellets, then the molding evaluation was carried out. The property evaluation results were inclusively shown in Table 2.

Comparative Example 1

The continuous carbon fiber bundle prepared in Reference Example 1 as it is, which is not adhered with the propylene resin mixture, was submitted, to the evaluation. In the step of preparing short fiber pellets, carbon fibers fluffed so that the process could not be advanced furthermore.

Comparative Example 2

The procedure of Example 2 was repeated except that the emulsion of the propylene resin mixture PP(1) was adhered on a carbon fiber bundle by a roller impregnation method and then the emulsion having the same concentration was adhered on the bundle again by the roller impregnation method to prepare short fiber pellets, then the molding evaluation was carried out. The property evaluation results were inclusively shown in Table 3.

Comparative Example 3

The procedure of Example 2 was repeated except that the emulsion of the propylene resin mixture PP(9) prepared in Reference Example 11 was used to prepare short fiber pellets, then the molding evaluation was carried out. The property evaluation results were inclusively shown in Table 3.

Comparative Example 4

The procedure of Example 2 was repeated except that the emulsion of the propylene resin mixture PP(10) prepared in Reference Example 12 was used to prepare short fiber pellets, then the molding evaluation was carried out. The property evaluation results were inclusively shown in Table 3.

Comparative Example 5

The procedure of Example 2 was repeated except that the emulsion of the propylene resin mixture PP(11) prepared in Reference Example 13 was used to prepare short fiber pellets, then the molding evaluation was carried out. The property evaluation results were inclusively shown in Table 3.

TABLE 1

| | | | Example 1 | Example 2 | Example 3 | Example 4 | Example 5 | Example 6 |
|---|---|---|---|---|---|---|---|---|
| (A) Reinforcing fiber | | | Carbon fiber 1 | Carbon fiber 1 | Carbon fiber 1 | Carbon fiber 1 | Carbon fiber 1 | Carbon fiber 1 |
| | Surface oxygen concentration (O/C) | — | 0.06 | 0.06 | 0.06 | 0.06 | 0.06 | 0.06 |
| | Filament | fibers | 24,000 | 24,000 | 24,000 | 24,000 | 24,000 | 24,000 |
| | amount | wt % | 20 | 20 | 20 | 20 | 20 | 20 |
| Propylene resin mixture (Mixture of (B) and (C)) | | | PP(1) | PP(1) | PP(1) | PP(1) | PP(12) | PP(2) |
| (B) First propylene resin | Kind | — | B-1 | B-1 | B-1 | B-1 | B-1 | B-1 |
| | Mw | — | 90,000 | 90,000 | 90,000 | 90,000 | 90,000 | 90,000 |
| | Functional group | — | — | — | — | — | — | — |
| | Amount of | mm mol | — | — | — | — | — | — |

TABLE 1-continued

|  |  |  | Example 1 | Example 2 | Example 3 | Example 4 | Example 5 | Example 6 |
|---|---|---|---|---|---|---|---|---|
|  | Functional group | equivalent weight |  |  |  |  |  |  |
|  | Amount | wt % | 3.6 | 3.6 | 1.1 | 7 | 5 | 2 |
| (C) Second Propylene resin | Kind | — | C-1 | C-1 | C-1 | C-1 | C-1 | C-2 |
|  | Mw | — | 25,000 | 25,000 | 25,000 | 25,000 | 25,000 | 5,000 |
|  | Functional group |  | COOK | COOK | COOK | COOK | COOK | COOK |
|  | Conversion of functional group | % | 100 | 100 | 100 | 100 | 100 | 100 |
|  | Amount of functional group | mm mol equivalent weight | 0.81 | 0.81 | 0.81 | 0.81 | 0.81 | 0.81 |
|  | Amount | wt % | 0.4 | 0.4 | 0.1 | 0.7 | 5 | 0.2 |
| (D) Third propylene resin | Kind |  | D-1 (100%) | D-1(50%) D-2(50%) | D-1(50%) D-2(50%) | D-1(50%) D-2(50%) | D-1(50%) D-2(50%) | D-1(50%) D-2(50%) |
|  | Functional group |  | — | Maleic anhydride | Maleic anhydride | Maleic anhydride | Maleic anhydride | Maleic anhydride |
|  | Amount of Functional group | mm mol equivalent weight | 0.5 | 0.5 | 0.5 | 0.5 | 0.5 | 0.5 |
|  | Amount | wt % | 76 | 76 | 78.8 | 72.3 | 70 | 76 |
| Interfacial adhesion condition[1] |  | — |  | A | A | B | A | A | A |
| Flexural strength[2] |  | — |  | B | B | C | B | C | B |
| Notched lzod impact value[3] |  | — |  | B | A | C | B | B | C |

TABLE 2

|  |  |  | Example 7 | Example 8 | Example 9 | Example 10 | Example 11 | Example 12 | Example 13 |
|---|---|---|---|---|---|---|---|---|---|
| (A) Reinforcing fiber |  | — | Carbon fiber 1 | Carbon fiber 1 | Carbon fiber 1 | Carbon fiber 1 | Carbon fiber 1 | Carbon fiber 1 | Carbon fiber 2 |
|  | Surface oxygen concentration (O/C) | — | 0.06 | 0.06 | 0.06 | 0.06 | 0.06 | 0.06 | 0.12 |
|  | Filament | fibers | 24,000 | 24,000 | 24,000 | 24,000 | 24,000 | 24,000 | 24,000 |
|  | amount | wt % | 20 | 20 | 20 | 20 | 20 | 20 | 20 |
| Propylene resin mixture (Mixture of (B) and (C)) |  |  | PP(3) | PP(4) | PP(5) | PP(6) | PP(7) | PP(8) | PP(1) |
| (B) First propylene resin | Kind | — | B-1 | B-1 | B-1 | B-1 | B-1 B-2 | B-3 | B-1 |
|  | Mw | — | 90,000 | 90,000 | 90,000 | 90,000 | B-1(90,000) B-2(300,000) | 70,000 | 90,000 |
|  | Functional group |  | — | — | — | — | — | COOK | — |
|  | Amount of Functional group | mm mol equivalent weight | — | — | — | — | — | 0.81 | — |
|  | Amount | wt % | 3.6 | 3.6 | 3.6 | 3.6 | 3.6 | 3.6 | 3.6 |
| (C) Second Propylene resin | Kind | — | C-3 | C-4 | C-5 | C-6 | C-1 | C-1 | C-1 |
|  | Mw | — | 25,000 | 25,000 | 25,000 | 40,000 | 25,000 | 25,000 | 25,000 |
|  | Functional group |  | COOK | COOK | COONH$_4$ | COOK | COOK | COOK | COOK |
|  | Conversion of functional group | % | 100 | 70 | 100 | 100 | 100 | 100 | 100 |
|  | Amount of functional group | mm mol equivalent weight | 0.1 | 0.81 | 0.81 | 0.81 | 0.81 | 0.81 | 0.81 |
|  | Amount | wt % | 0.4 | 0.4 | 0.4 | 0.4 | 0.4 | 0.4 | 0.4 |
| (D) Third propylene resin | Kind |  | D-1(50%) D-2(50%) | D-1(50%) D-2(50%) | D-1(50%) D-2(50%) | D-1(50%) D-2(50%) | D-1(50%) D-2(50%) | D-1(50%) D-2(50%) | D-1(50%) D-2(50%) |
|  | Functional group |  | Maleic anhydride | Maleic anhydride | Maleic anhydride | Maleic anhydride | Maleic anhydride | Maleic anhydride | Maleic anhydride |
|  | Amount of Functional group | mm mol equivalent weight | 0.5 | 0.5 | 0.5 | 0.5 | 0.5 | 0.5 | 0.5 |
|  | Amount | wt % | 76 | 76 | 76 | 76 | 76 | 76 | 76 |
| Interfacial adhesion condition[1] |  | — | B | B | A | A | A | A | A |
| Flexural strength[2] |  | — | C | B | A | B | A | B | A |

TABLE 2-continued

|  |  | Example 7 | Example 8 | Example 9 | Example 10 | Example 11 | Example 12 | Example 13 |
|---|---|---|---|---|---|---|---|---|
| Notched Izod impact value[3] |  | — | C | C | B | C | B | B | A |

TABLE 3

| | | | Comparative Example 1 | Comparative Example 2 | Comparative Example 3 | Comparative Example 4 | Comparative Example 5 |
|---|---|---|---|---|---|---|---|
| (A) Reinforcing fiber | | | Carbon fiber 1 | Carbon fiber 1 | Carbon fiber 1 | Carbon fiber 1 | Carbon fiber 1 |
| | Surface oxygen concentration (O/C) | | 0.06 | 0.06 | 0.06 | 0.06 | 0.06 |
| | Filament | fibers | 24,000 | 24,000 | 24,000 | 24,000 | 24,000 |
| | amount | wt % | 20 | 20 | 20 | 20 | 20 |
| Propylene resin mixture (Mixture of (B) and (C)) | | | — | PP(1) | PP(9) | PP(10) | PP(11) |
| (B) First propylene resin | Kind | — | — | B-1 | — | B-4 (same as C-1) | B-1 |
| | Mw | — | — | 90,000 | 100,000 | 25,000 | 90,000 |
| | Functional group | | — | — | — | COOK | — |
| | Amount of Functional group | mm mol equivalent weight | — | — | — | 0.81 | — |
| | Amount | wt % | — | 15 | 4 | 3.6 | 3.6 |
| (C) Second Propylene resin | Kind | — | — | C-1 | — | C-1 | C-7 |
| | Mw | — | — | 25,000 | — | 25,000 | 200,000 |
| | Functional group | | — | COOK | — | COOK | COOK |
| | Conversion of functional group | % | — | 100 | — | 100 | 100 |
| | Amount of functional group | mm mol equivalent weight | — | 0.81 | — | 0.81 | 0.81 |
| | Amount | wt % | — | 1.5 | — | 0.4 | 0.4 |
| (D) Third propylene resin | Kind | | D-1(50%) D-2(50%) | D-1(50%) D-2(50%) | D-1(50%) D-2(50%) | D-1(50%) D-2(50%) | D-1(50%) D-2(50%) |
| | Functional group | | Maleic anhydride | Maleic anhydride | Maleic anhydride | Maleic anhydride | Maleic anhydride |
| | Amount of Functional group | mm mol equivalent weight | 0.5 | 0.5 | 0.5 | 0.5 | 0.5 |
| | Amount | wt % | 60 | 63.5 | 76 | 76 | 76 |
| Interfacial adhesion condition[1] | | | — | — | B | C | B | C |
| Flexural strength[2] | | | — | — | D | D | C | D |
| Notched Izod impact value[3] | | | — | — | D | D | D | C |

In the tables 1 to 3,
(1) A: The resin adhered region is not less than 90%.
B: The resin adhered region is not less than 50% and less than 90%.
C: The resin adhered region is less than 50%.
(2) A: Not less than 120 MPa
B: Not less than 100 MPa and less than 120 MPa
C: Not less than 80 MPa and less than 100 MPa
D: Less than 80 MPa
(3) A: Not less than 210 J/m
B: Not less than 180 J/m and less than 210 J/m
C: Not less than 150 J/m and less than 180 J/m
D: Less than 150 J/m As described in the above, in Examples 1 to 13, molded articles having excellent interfacial adhesion between the reinforcing fiber and the propylene resins and excellent mechanical properties could be prepared.

On the other hand, in Comparative Example 1, nothing was adhered on the carbon fiber bundle and thereby a molding material (short fiber pellets) could not be prepared. In Comparative Examples 2 to 5, molded articles having sufficient mechanical properties could not be prepared.

Industrial Use

Since the fiber reinforced propylene resin composition of the present invention has good interfacial adhesion between the reinforcing fiber and the propylene resin, it has excellent flexural properties and impact resistance; molded articles prepared using the fiber reinforced propylene resin composition have excellent flexural properties and impact resistance; and are suitably used for electric and electronic equipments, OA equipments, home electrical appliances, automobile parts, internal parts and housings.

Description of Numeral

1: Filaments of a reinforcing fiber bundle (A)

2: Mixture of the first propylene resin (B), the second propylene resin (C) and the third propylene resin

The invention claimed is:

1. A fiber reinforced propylene resin composition comprising:
   (A) 1 to 75% by weight of a reinforcing fiber,
   (B) 0.01 to 10% by weight of a first propylene resin containing 50 to 99% by mol of a constituting unit derived from propylene, wherein the propylene resin is an unmodified propylene resin having less than 0.05 mmol equivalent weight in terms of the group represented by —C(=O)—O— per 1 gram of the component (B),
   (C) 0.01 to 10% by weight of a second propylene resin at least containing a carboxylic acid salt bonded to a polymer chain, wherein the propylene resin has a weight average molecular weight of 5,000 to 30,000, and
   (D) 5 to 98.98% by weight of a third propylene resin, wherein the order of the weight average molecular weights Mw of the components (B) to (D) satisfy the following relation;
   component (D)>component (B)>component (C).

2. The fiber reinforced propylene resin composition according to claim 1 wherein the component (C) is contained in an amount of 0.3 to 45 parts by weight based on 100 parts by weight of the component (B).

3. The fiber reinforced propylene resin composition according to claim 1 wherein the component (C) at least contains a carboxylic acid salt in a total concentration of 0.05 to 5 mmol equivalent weight in terms of a group represented by the formula (1) per 1 gram of the component(C),

—C(=O)—O— (1)

4. The fiber reinforced propylene resin composition according to claim 1 wherein 50 to 100% of the carboxylic acid group bonded to a polymer chain of the component (C) is converted into one or two or more metal salts selected from the group consisting of lithium salt, potassium salt, sodium salt, calcium salt, magnesium salt and zinc salt.

5. The fiber reinforced propylene resin composition according to claim 1 wherein 50 to 100% of the carboxylic acid group bonded to a polymer chain of the component (C) is converted with ammonium salt.

6. The fiber reinforced propylene resin composition according to claim 1 wherein the component (B) comprises 30 to 100% by weight of a propylene resin (B-1) having a weight average molecular weight of not less than 30,000 and less than 150,000 and 0 to 70% by weight of a propylene resin (B-2) having a weight average molecular weight of not less than 150,000 and not more than 500,000.

7. The fiber reinforced propylene resin composition according to any one of claims 1 wherein the component (D) has a carboxylic acid bonded to a polymer chain and/or its salt group.

8. The fiber reinforced propylene resin composition according to claim 7 wherein the component (D) comprises 5 to 50% by weight of a propylene (D-1) having a carboxylic acid bonded to a polymer chain and/or its salt group and 50 to 95% by weight of a propylene resin (D-2) not having a carboxylic acid or its salt group.

9. The fiber reinforced propylene resin composition according to claims 1 wherein the reinforcing fiber of the component (A) is carbon fiber.

10. The fiber reinforced propylene resin composition according to claim 9 wherein the carbon fiber has a surface oxygen concentration ratio (O/C), as measured by a X ray photoelectron spectroscopy for chemical analysis (ESCA), of 0.05 to 0.5.

11. The fiber reinforced propylene resin composition according to claim 1 wherein the reinforcing fiber of the component (A) is a fiber bundle made from 20,000 to 100,000 filaments.

12. The fiber reinforced propylene resin composition according to claim 1 wherein the reinforcing fiber of the component (A) is a chopped fiber having a fiber length of 1 to 30 mm.

13. The fiber reinforced propylene resin composition according to claim 1 wherein the difference between the weight average molecular weight of the component (B), (Mw(b)) and that of the component (C), (Mw(c)), which is defined as (Mw(b)-Mw(c)), is not less than 1,000, and the difference between the weight average molecular weight of the component(D), (Mw(d)) and Mw(b), which is defined as (Mw(d)-Mw(b)), is not less than 1,000.

* * * * *